United States Patent [19]

Googin et al.

[11] 3,887,486

[45] June 3, 1975

[54] POROUS, MICROSPHEROIDAL, NUCLEAR FUELS HAVING INTERNAL POROSITY

[75] Inventors: John M. Googin; Charles R. Schmitt, both of Oak Ridge, Tenn.

[73] Assignee: The United States of America as represented by the United States Energy Research and Development Administration, Washington, D.C.

[22] Filed: Oct. 16, 1972

[21] Appl. No.: 298,134

Related U.S. Application Data

[62] Division of Ser. No. 48,579, May 25, 1970, abandoned.

[52] U.S. Cl. ........ 252/301.1 R; 176/67; 176/91 SP; 264/0.5; 264/29
[51] Int. Cl. ............................................... G21c 3/02
[58] Field of Search .............................. 252/301.1 R; 176/67–69, 91 SP; 264/0.5, 29

[56] References Cited
UNITED STATES PATENTS

| | | | |
|---|---|---|---|
| 3,097,151 | 7/1963 | Martin | 252/301.1 R |
| 3,403,008 | 9/1968 | Hamling | 423/251 |
| 3,438,749 | 4/1969 | Lonadier et al. | 423/251 |
| 3,649,452 | 3/1972 | Chin et al. | 176/68 |
| 3,673,101 | 6/1972 | McKenney et al. | 252/301.1 R |
| 3,764,550 | 10/1973 | Block et al. | 252/301.1 R |

*Primary Examiner*—Benjamin R. Padgett
*Assistant Examiner*—R. E. Schafer
*Attorney, Agent, or Firm*—John A. Horan; David S. Zachry; Irving Barrack

[57] ABSTRACT

A process is described for the preparation of microspheroidal particles comprising absorbing uranium cations from a uranyl aqueous solution onto small spherical ion exchange resin particles, drying the uranium-loaded resin, and then carbonizing the dried resin to form a porous carbon spheroid having closed porosity with an oxide or carbide or uranium uniformly dispersed within its volume. The same general technique can be used to form microspheres of the oxides or carbides of other actinide metals.

13 Claims, No Drawings

3,887,486

POROUS, MICROSPHEROIDAL, NUCLEAR FUELS HAVING INTERNAL POROSITY

BACKGROUND OF THE INVENTION

The invention described herein was made in the course of, or under, a contract with the U.S. Atomic Energy Commission.

This is a division of application Ser. No. 48,579, filed May 25, 1970, now abandoned.

The present invention relates to a novel nuclear fuel composition characterized as microspheroidal particles consisting of a porous carbon matrix and an oxide or carbide of uranium uniformly dispersed within the volume of said matrix.

In the ideal sense, a model fabrication process for a nuclear fuel is one which is characterized by simplicity, economy of operation, and by its amenability to reproduce a nuclear fuel which meets product requirements for use in a power-producing reactor. In addition, it is most advantageous if the fuel is so constructed that it can readily be reprocessed for recovery of fissile and fertile values after its discharge from a going reactor.

It is accordingly the principal object of this invention to provide a nuclear fuel and a process for its fabrication which meets these aforementioned criteria.

SUMMARY OF THE INVENTION

In its product aspect, this invention is concerned with a microspheroidal particle having a particle size in the range 5 to 2,000 microns. It consists essentially of a porous carbon or graphite matrix containing a homogeneously dispersed phase consisting of an oxide, carbide, nitride, or silicide of a fissionable or fertile metal or alloy thereof. A unique feature of the porous matrix is that its porosity is mainly of the closed-pore type, of the order of 30 volume per cent, as measured metallographically. A particular advantage of the microspheroidal particles of this invention is the fact that a considerable percentage of the fissionable or fertile values are found within the closed pores of the matrix which serve as a convenient trap for gaseous fission products generated during the course of the fission process. In instances where higher degrees of fission product retention are required, the spheroidal particle can be coated with pyrolytically deposited carbon or carbide layers to develop essentially complete gas impermeability. When a fuel loading of the microspheroidal particles of this invention has reached its useful life, it is readily removable from the reactor and can be processed by well known chemical reprocessing techniques to recover fissionable and fertile values as well as useful fission products. Such reprocessing in one suggested scheme would merely involve oxidation of the carbon or graphite matrix in air or oxygen at an elevated temperature sufficient to gasify the carbon, leaving a residue readily dissolvable in aqueous acidic media to produce a feed solution from which the dissolved fissionable and fertile values can be readily separated by well known solvent extraction techniques.

In its process aspect, the present invention is concerned with a process for the preparation of microspheroidal particles of the character described which comprises immersing or contacting spheroidal organic ion exchange resin particles or sorbing selected metal cations on an organic ion exchange resin to a desired loading, drying the loaded resin particles, and then carbonizing the dried resin. Among the ion exhange resins useful in making the porous microspheroidal particles of this invention are cation exchange resins containing sulfonic, phosphonic, or carboxylic acid as the functional group at sites along a polymeric backbone chain and anion exchange resins containing quaternary ammonium, primary, secondary, and tertiary amine groups along a backbone polymer chain. Sorption on anion exchange resins occurs from acidic solutions such as aqueous solutions of nitric, sulfuric, or carbonic acid.

Among the particular commercial ion exchange resins useful in the process of this invention are Dowex 1, Dowex 21K, Dowex 50X12, and Dowex 50W, although ion exchange resins from other commercial vendors would be equally satisfactory. Dowex 1 and Dowex 21K are anion exchange resins incorporating a quaternary ammonium type of structure in which the four substituents on the nitrogen atom are a polymeric benzyl and three methyl groups.

Dowex 50W is a strongly acidic cation resin made by the nuclear sulfonation of styrene-divinylbenzene beads. It may be designated chemically as $R.SO_3H$, where R represents the polystyrene resin.

The degree of crosslinkage in an ion exchange resin bead refers to the fraction of divinylbenzene it contains. For the Dow Chemical Company resins, the per cent crosslinkage is indicated by a number following an "X" after the name of a particular resin. Thus, Dowex 1X1 resin is made from a copolymer containing 1 per cent divinylbenzene and Dowex 1X10 resin would contain 10 per cent divinylbenzene. The divinylbenzene content contributes the third dimension to the polymer network and makes it insoluble. The very low crosslinked resins are highly swollen, allow faster diffusion of ions within the resins, and are soft and easily deformed. The higher crosslinked (10 per cent) resins are harder and do not swell as much when exposed to solutions.

The conditions under which a desired degree of metal cation loading can be obtained in a reproducible manner are well known in the available literature. See, for example, "Anion Exchange of Uranium in Nitrate Solutions," *Journal of Chemical and Engineering Data*, Vol. VI, No. 2, April 1961, p. 217, etc.

After loading has been accomplished to the extent desired, the loaded resin particles are then separated from the solution either by decantation or filtration. Excess liquid is removed by washing and the separated resin particles are then dried to remove excess moisture. The loaded resin particles should be thoroughly dried at non-carbonizing temperatures. If they are not, there is a risk that subsequent carbonization will cause cracking or decrepitation of the particles as the resin is converted to carbon or graphite. Drying to remove moisture can be effected at a temperature of about 110°C.

The dried, metal-loaded ion exchange resin spheres are then subjected to a carbonization reaction by heating slowly in an inert atmosphere to a temperature adequate to convert the resin spheres to carbon using a controlled heating cycle. Normally, a temperature of 900°–1100°C. is adequate to accomplish carbonization. A satisfactory heating rate is one which allows gases from the internal volume of the metal-loaded resins to be dispelled without excessive internal particle deformation, decrepitation, or cracking of the particles. In order to maintain the sphericity of the particles, it is preferred that the particles be carbonized in a fluidized bed using an inert gas as the fluidizing medium.

In describing this process for making microspheroidal particles it should be made clear that the sphericity desired in the final product is a function of the degree of sphericity of the unloaded resin beads, and the subsequent processing involved in converting the metal-loaded beads to carbon or graphite. These and other specific aspects of the invention discussed heretofore in general terms will be made clearer in the specific embodiments to be described in the following examples.

EXAMPLE I

A batch of Dowex 1X1 (50-100 mesh) anion exchange resin was converted to the nitrate form by treatment with 0.9 M $NH_4NO_3$ — 0.1 M $HNO_3$ solution in an ion exchange column until the column effluent was free of chloride ion. The resin was then rinsed with distilled water. Three 100-gram portions of the resin were loaded with uranyl nitrate by equilibrating with 800 ml of 6.0 M $NH_4NO_3$ solution containing sufficient dissolved uranyl nitrate to provide various uranium loadings of 50 to 150 g U/Kg dry resin according to predetermined equilibrium relationships. The resins were then filtered, air dried, dried in an oven at 100°C., and carbonized under flowing helium. One 100-gram portion was carbonized at 500°C., another at 700°C., and a third at 850°C. Each portion was carbonized for 1 hour. The analytical results of these three portions are shown in Table I.

TABLE I

Carbonization of Uranium-Loaded Ion Exchange Resin

| Sample No. | Initial Uranium Loading[a] | Carbonization Temperature (°C.)[b] | Coke Analysis | | | Nitrogen ppm |
|---|---|---|---|---|---|---|
| | | | Color | gU/g | % Carbon | |
| IEC-1 | 56.5 | 500 | Brown | 0.224 | 55.16 | 360 |
| IEC-2 | 92.1 | 700 | Black | 0.3582 | 47.48 | 243 |
| IEC-3 | 135.6 | 850 | Black | 0.4486 | 38.79 | 189 |

[a] Gram uranium per Kg dry resin.
[b] 1.0-hour soak time in flowing helium.

Spectrographic analyses of pulverized coke product (−40 mesh) indicate that a high degree of uranium and carbon purity is attained by this method.

The foregoing example is included to show that variable loadings of uranium can be attained, that some decomposition of the resin occurs at temperatures below 950°C., but that complete conversion of the resin to carbon requires higher carbonization temperatures.

EXAMPLE II

A batch of Dowex 21K (16-20 mesh) anion resin was loaded with uranyl nitrate by equilibrating with 6.0 M ammonium nitrate solution containing sufficient uranyl nitrate to provide an initial uranium loading of 29 g U/Kg dry resin. The resin was filtered, air dried, and carbonized under flowing helium for 1 hour at 950°C. using a vertical quartz furnace. While a heating cycle of approximately 6 hours can be used to attain the target carbonization temperature of 950°C., a much slower heating cycle is desirable to avoid large internal fissures that may result from dispellation of volatiles at too rapid a rate. The batch of 950°C.-carbonized resin beads was then heated in flowing helium for 3 hours at at least 1,700°C. and not more than 2,200°C. in a carbon induction furnace. No significant shrinkage was noted as comparable to that which took place during carbonization.

Photomicrographs of cross sections of the carbonized uranium-loaded beads after 950° and 2,200°C. heat treatments showed the carbonized beads to contain internal porosity or fissures. Cross sections of Dowex 21K resin beads before and after uranyl nitrate adsorption have been examined to show that the internal voids and fissures are not inherent in the anion exchange resin structure before carbonization.

X-ray diffraction studies of the uranium-loaded resin after carbonizing at 950°C. and high firing at 1,400°, 1,700°, and 2,200°C. under flowing helium were made in order to identify the chemical form of the uranium associated with the carbon matrix at these various firing temperatures. A comparison of the X-ray diffraction patterns obtained with $UO_2$, UC, graphite, and $U_3O_8$ standards showed that at 1,400°C. the uranium is present as almost all $UO_2$. At 1,700°C., the diffraction pattern of the coked resin shows the presence of $UO_2$ and UC, with some carbon. A comparison of the X-ray diffraction patterns of the resin high fired at 2,200°C. with standard patterns of uranium monocarbide and uranium dicarbide showed the presence of both UC and $UC_2$.

A summary of the uranium content, carbon content, and mercury displacement density for uranium-loaded Dowex 21K resin beads after heating under flowing helium at 950°C., 1,700°C., and 2,200°C. is given in Table II.

TABLE II

Properties of Coked, Uranium-Loaded Ion Exchange Resin

| Heat Treatment °C. | g U/g Coke | % Carbon | Density g/l |
|---|---|---|---|
| 950 | 0.03977 | 86.16 | 0.933 |
| 1400 | 0.04313 | — | 0.930 |
| 2200 | 0.04318 | 95.14 | 0.980 |

These data indicate that crystallization is rather incomplete at 950°C. as shown by the large increase in X-ray line intensities upon high firing at 2,200°C.

Cross-sectional examination at 1,000 magnification of elongated and spherical beads after high firing at 2,200°C. showed the uranium carbide homogeneously dispersed in the solid portion of the carbonized bead as pepper-like grains.

EXAMPLE III

One pound of Dowex 50W cation exchange resin microspheres, having 50–100 mesh size, was soaked for 16 hours in a uranyl nitrate solution. This solution was prepared by dissolving $U_3O_8$ in 8 N nitric acid. Subsequent dilution with distilled water produced an approximate 0.5 N $UO_2(NO_3)$ solution.

The loaded resin microspheres were dried at 110°C. for 16 hours after which they were carbonized in a fluidized bed using helium as the fluidizing medium. Carbonization was accomplished at 1,000°C. using a maximum temperature rise of 200°C/hr.

The resultant uranium-loaded microspheres contained about 22 per cent uranium by weight in the form of USO, as indicated by X-ray diffraction analysis. (The sulfur was present because sulfonated cation exchange resins were used. At 1,600°C., uranyl nitrate on sulfonated cation resins converts to $UO_2$—$UC_2$, as indicated by X-ray diffraction analysis. Compounds of uranium and oxygen would result if the carboxylic acid form of cation exchange resin were used.) They had a density of about 1.9 g/cc and an open porosity of about 40 per cent. The microsphere products were further characterized by metallography and microradiography. These techniques showed that a uniform distribution of uranium in the microsphere was achieved.

Uranium-containing microspheres prepared as described in Example III were coated with pyrolytic carbon to give either an interrupted duplex coating or a monolayer coating. For the interrupted duplex coating, a 20-micron-thick, low-density coating (about 1.6 g/cc) was applied using propylene in a fluidized bed at 1,250°C. This was followed by the application of a 50-micron-thick, high-density layer (about 1.8 g/cc) also using propylene but increasing the temperature to 1,900°C.

Monolayers of both 60-micron and 80-micron thickness were applied to some of the microspheres in a fluidized bed using propylene at 1,400°C. These coatings had a density of about 1.75 g/cc.

EXAMPLE IV

A batch of Dowex 50X12 cation exchange resin (100–200 mesh spheres) in the hydrogen form was contacted with uranyl sulfate solution (approximately 200 gU/liter) for 48 hours using magnetic stirring. The resin was filtered, rinsed rapidly with distilled water to remove any residual mother liquor, and dried at 110°C. This treatment provided a resin uranium loading of 7.32 grams uranium per kilogram of dry resin. After carbonizing with helium at 900°C., the resin spheres analyzed 1.85 per cent uranium, 79.18 per cent carbon, and 6.08 per cent sulfur. By subsequent high firing to temperatures of 1,800°C. or higher in an inert atmosphere, the sulfur can be essentially completely removed.

In the examples, the process of forming uranium-containing microspheroidal particles is provided as a specific embodiment. It should be understood, however, that the general technique described in forming uranium-containing microspheres can be adapted for making actinide oxide- or carbide-containing microspheres of plutonium and thorium or mixtures of uranium, thorium, and plutonium. In addition, it should be noted that alloys of the actinides can also be formed as inclusions within the internal volume of the carbonized or graphitized matrix by appropriate loading of the resin. For example, where it is desired to form a microsphere containing a uranium-zirconium alloy, the resin is loaded with uranium and zirconium salts in the proportions corresponding to the desired alloy composition and then the process of microsphere formation proceeds by the appropriate carbonization or graphitization reactions.

What is claimed is:

1. A microspheroidal particle consisting essentially of a porous matrix of carbon or graphite, a substantial portion of the porosity of said matrix being of the closed-pore type, and an oxide or carbide of a metal selected from the group uranium, plutonium, and thorium within the internal volume and closed pores of said matrix.

2. The particle of claim 1 and at least one pyrolytic carbon coating deposited on the surface of said particle.

3. The particle of claim 1 wherein the matrix is graphite and the selected metal is uranium distributed within said matrix as a uranium carbide.

4. The particle of claim 1 wherein the matrix is carbon and the selected metal is a mixture of uranium and thorium distributed within said matrix as their respective carbides.

5. The particle of claim 1 wherein the matrix is carbon and the selected metal is a mixture of uranium and plutonium distributed within said matrix as their respective carbides.

6. Microspheres of uranium carbide produced by loading an ion exchange resin containing ion exchange sites for sorbing uranyl ions, drying the loaded resin and then heating said dried resin in an inert atmosphere at a temperature in the range 1,400°–2,200°C. to convert the resin to a porous carbon matrix containing closed pores and a homogeneously dispersed uranium carbide phase.

7. The particle of claim 6 with at least one pyrolytic carbon coating deposited thereon.

8. The particle of claim 1 wherein the matrix comprises carbon and the metal carbide within said matrix is a uranium carbide.

9. The particle of claim 1 wherein the matrix is carbon and $UO_2$ within said matrix.

10. The particle of claim 1 wherein the matrix comprises carbon and a mixture of a uranium carbide and a uranium oxide within said matrix.

11. The particle of claim 1 wherein the matrix is carbon and a mixture of $UO_2$ and UC within said matrix.

12. A microspheroidal particle 5 to 2,000 microns in diameter consisting essentially of a porous carbon matrix and a compound selected from the group consisting of an oxide and a carbide of at least one metal selected from the group consisting of uranium, plutonium, and thorium distributed within said matrix.

13. The particle of claim 12 with at least one pyrolytic carbon coating deposited thereon.

* * * * *